United States Patent [19]
Yoon et al.

[11] Patent Number: 5,234,557
[45] Date of Patent: * Aug. 10, 1993

[54] NONLINEAR OPTICAL MEDIUM WITH A STABLE NONCENTROSYMMETRIC POLYMERIC STRUCTURE

[75] Inventors: Hyun-Nam Yoon, New Providence; Hong-Tai Man, Basking Ridge, both of N.J.

[73] Assignee: Hoechst Celanese Corp., Somerville, N.J.

[*] Notice: The portion of the term of this patent subsequent to Oct. 1, 2008 has been disclaimed.

[21] Appl. No.: 664,263

[22] Filed: Mar. 4, 1991

Related U.S. Application Data

[63] Continuation-in-part of Ser. No. 540,403, May 22, 1990, Pat. No. 5,053,168, which is a continuation of Ser. No. 181,751, Apr. 14, 1988, abandoned.

[51] Int. Cl.⁵ ............................................. F21V 9/04
[52] U.S. Cl. .................................. 204/164; 204/131; 252/587; 252/299.01; 252/582
[58] Field of Search ................... 252/587, 299.01, 582; 204/164, 131

[56] References Cited

U.S. PATENT DOCUMENTS 5,053,168 10/1991 Man et al. .......................... 252/587

Primary Examiner—John Niebling
Assistant Examiner—Arun S. Phasge
Attorney, Agent, or Firm—Michael W. Ferrell

[57] ABSTRACT

A process for stabilizing a poled nonlinear optical media is disclosed and claimed. The inventive process includes the steps of heating a film of suitable polymer above its Tg, poling the film in an electric field and heat treating the medium while the field is maintained. Films so produced maintain their nonlinear optical activity over time at a much higher value than films that are not heat treated under the influence of an electric field.

11 Claims, 6 Drawing Sheets

NONLINEAR OPTICAL MEDIUM WITH A STABLE NONCENTROSYMMETRIC POLYMERIC STRUCTURE

CROSS REFERENCE TO RELATED APPLICATION

This application is a continuation-in-part of U.S. Ser. No. 07/540,403 now U.S. Pat. No. 5,053,168 of the same title, filed May 22, 1990 which in turn was a continuation of U.S. Ser. No. 07/181,751 filed Apr. 14, 1988 abandoned. The disclosure of the aforementioned application is hereby incorporated by reference.

BACKGROUND

It is known that organic and polymeric materials with large delocalized $\pi$—electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of electronic interactions responsible for nonlinear optical effects.

For materials having second-order nonlinear optical response, it can be shown by theoretical considerations that a noncentrosymmetric macrostructure is required. Typically, the same is achieved by heating a thermoplastic polymer containing NLO active chromophores above its glass transition temperature and subjecting it to an electric field, then cooling it with the field still on so that the ordered structure is frozen into place. It has been found that a structure so produced can be stabilized over time by control of heating and cooling during this "poling" process by way of heat or pressure treatments.

SUMMARY OF INVENTION

The present invention is directed to a method of stabilizing a polymeric second order nonlinear optical medium over time by way of minimizing the free volume of the medium during the poling/cooling process described above. In one embodiment, pressure is applied during annealing to speed the procedure and provide additional stabilization. Pressures employed are from about 100 to about 10,000 atmospheres.

Typical procedures in accordance with the present invention include: heating a polymeric film to a temperature of at least about its glass transition temperature (Tg); subjecting the polymer medium to an external electric field to induce noncentrosymmetry in the polymer medium by molecular orientation of the chromophores of the medium which exhibit second order nonlinear optical susceptibility and cooling the noncentrosymmetric polymer medium from about the aforesaid Tg to about 20° C. to solidify the medium while maintaining the electric field. The cooling step in accordance with the invention includes maintaining the polymer medium at a temperature intermediate the aforesaid Tg and 20° C. for a period of time sufficient to stabilize the induced structure from decay over time. During cooling, the electric field is maintained in accordance with the invention. Generally speaking, the temperature below Tg and above 20° C. is referred to herein as the annealing temperature which is generally from about eighty percent (80%) of Tg to about 40° C. for preferred polymeric materials provided initial cooling is sufficiently slow. Between about sixty percent (60%) of Tg and 40° C. is sufficient for most materials. The annealing temperature need not be maintained constant during the annealing process, so long as cooling is slow enough to provide sufficient thermal relaxation in the medium as it is cooled. Thus, the temperature could be slow cooled from about Tg to about 40° C. over a period of several hours in accordance with the invention. Typical times during which the annealing temperature is maintained range from about one (1) hour to about three hundred hours, although longer times may be employed. If pressure is used to augment processing, times involved could be considerably shorter.

The invention is further defined in its various embodiments wherein annealing is carried out by maintaining a constant temperature or slow cooling the film following poling about a predetermined annealing temperature in the presence of the externally applied electric field. This can be effectively accomplished by cooling the film to an annealing temperature substantially below Tg, that is, no more than about ninety per cent of Tg, preferably between about 40° C. and sixty to eighty percent of Tg and annealing the film. During annealing which may take anywhere from about thirty minutes to about ten hours or more, the rate of cooling is between about 0° C. per minute and about 0.5° C. per minute and preferably between about 0° C. per minute and about 0.1° C. per minute.

BRIEF DESCRIPTION OF DRAWINGS

The invention is described in detail below with reference to the drawings, in which.

DETAILED DESCRIPTION

Figure 1:
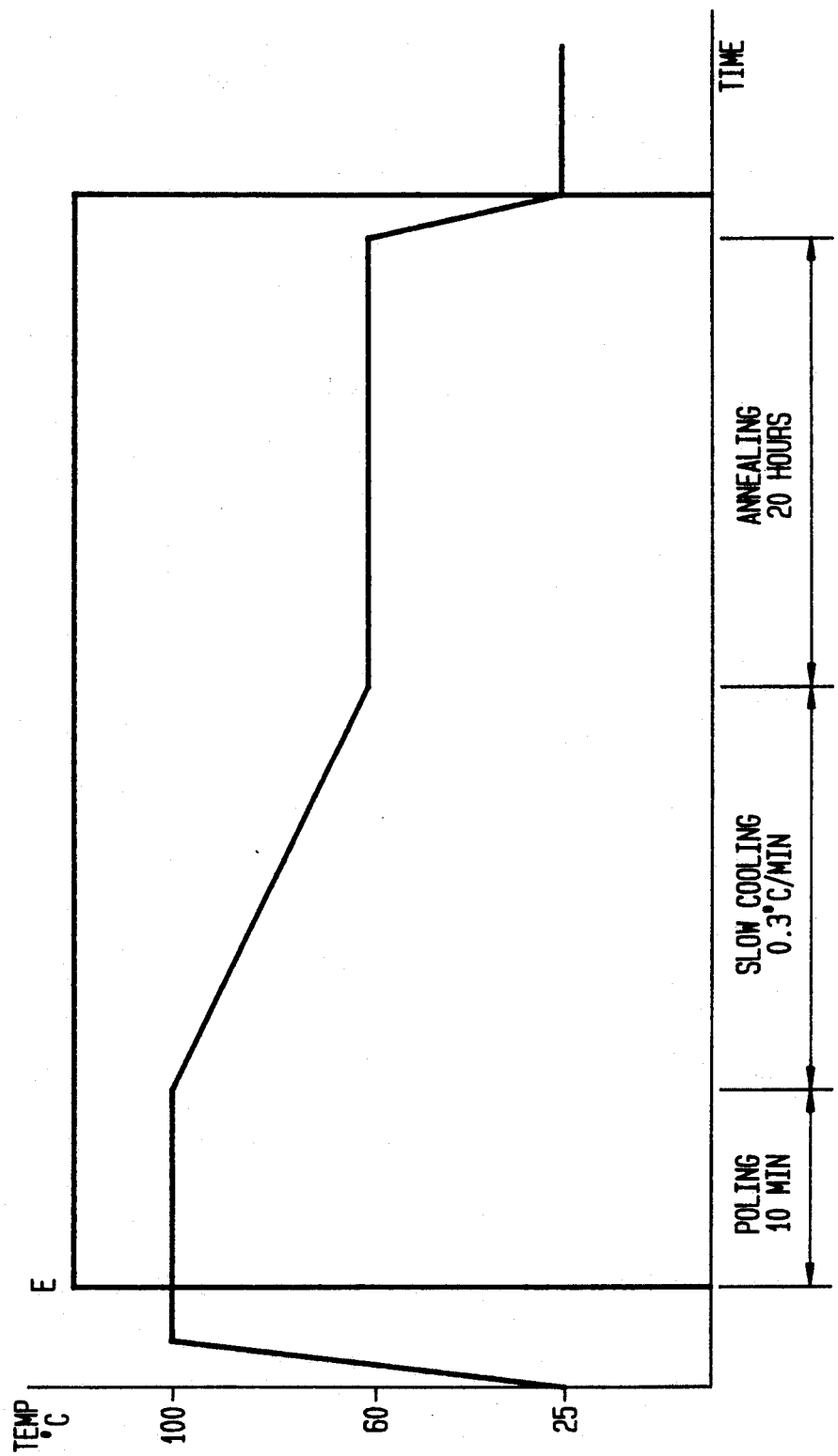
FIG. 1 is a schematic diagram which illustrates a poling/cooling procedure in accordance with the present invention.

Referring to FIG. 1, a typical embodiment of the present invention will now be described. Samples are prepared by spin coating a solvent solution of a nonlinear optically responsive polymer onto an ITO (indium-tin oxide) coated glass slide. The polymer layer is about 2-5 microns in thickness. The ITO coating is an electrical conductor and functions as one of the two electrodes required for molecular orientation of the polymer with an electric field. The second electrode is supplied by thermal evaporation of gold on the upper surface of the polymer layer.

The sample is heated to about its Tg (100° C. in the case of FIG. 1) as shown in FIG. 1 and poled in a DC field of about 100 V/micron for about ten (10) minutes. Following poling it is slow cooled at 0.3° C. per minutes to 60° C. and annealed for a relatively long time at that temperature while the field is maintained. The initial slow cooling may be at a rate of up to about 1 degree per minute. It should be noted that the electric field is maintained throughout the cooling process; as indicated by the lines designated E on the Figure.

Following poling, the second harmonic intensity level is determined by directing an incident laser beam of 1.34 μm wavelength perpendicular to a sample surface and then transmitted radiation at twice the frequency is measured at the other side of the sample. This second harmonic intensity from the polymer is a function of its second order nonlinear susceptibility $\chi^{(2)}$ and is used to measure the nonlinear optical activity.

In the examples which follow samples prepared in accordance with the above procedure are compared to samples prepared in the same way except that following poling for ten (10) minutes at Tg, the control samples are quenched to room temperature in about thirty (30) minutes rather than annealed as shown in FIG. 1.

Nonlinear Optical Stability

The nonlinear optical stability of a poled sample is determined by monitoring the second harmonic output after poling, and then at periodic time intervals during the cooling cycle under the electric field, and during the subsequent storage period at a given temperature.

The normalized $\chi^{(2)}$ relaxation curves for several side chain copolymers are determined. FIG. 2, FIG. 3, FIG. 4 and FIG. 5 represent plots of $\chi^{(2)}$ relaxation curves for polymers which are quenched after poling, or which are annealed after poling, while still subject to the electric field effect versus time of heat-aging. The storage temperature cycle, being the same for quenched and unquenched (heat-aging) samples, is without the electric field effect to permit observation of nonlinear optical activity loss.

Figure 2:
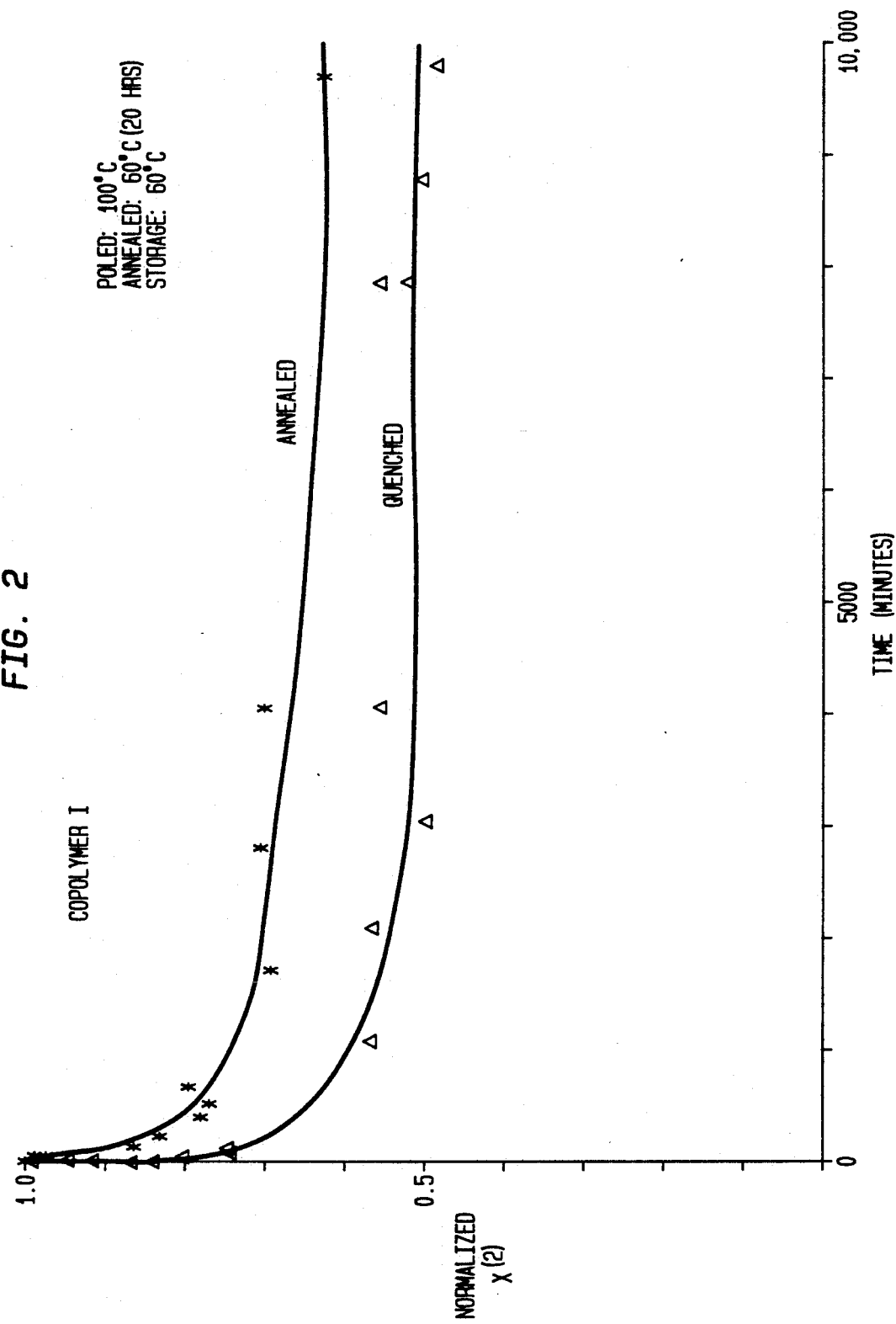
FIGS. 2 through 5 compare polymeric media processed in accordance the present invention to the same media that is quenched from about Tg to about room temperature in about thirty (30) minutes rather that stabilized in accordance with the present invention.
Figure 3:
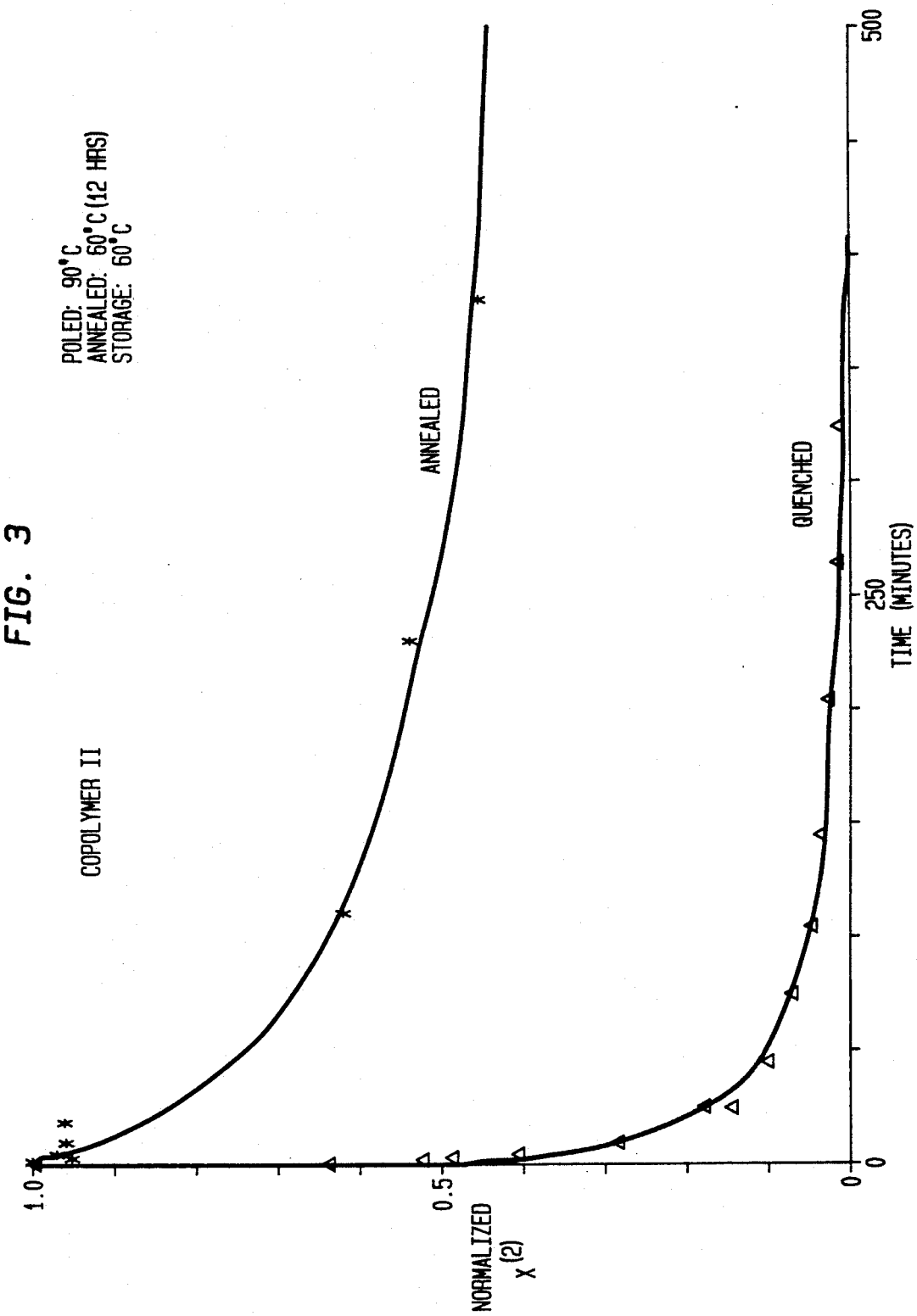

The B'/butyl methacrylate 50/50 copolymer I represented in FIG. 2 has a glass transition temperature (Tg) of 93° C., and corresponds to the formula:

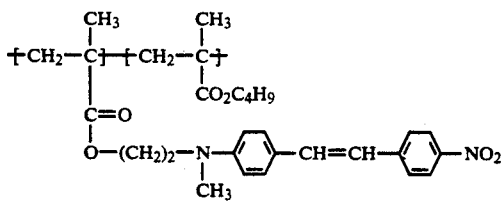

The B'/butyl methacrylate 25/75 copolymer II represented in FIG. 2 has a glass transition temperature (Tg) of 68° C., and corresponds to the FIG. 2 copolymer structure above except for the molar proportions of monomer units.

Figure 4:
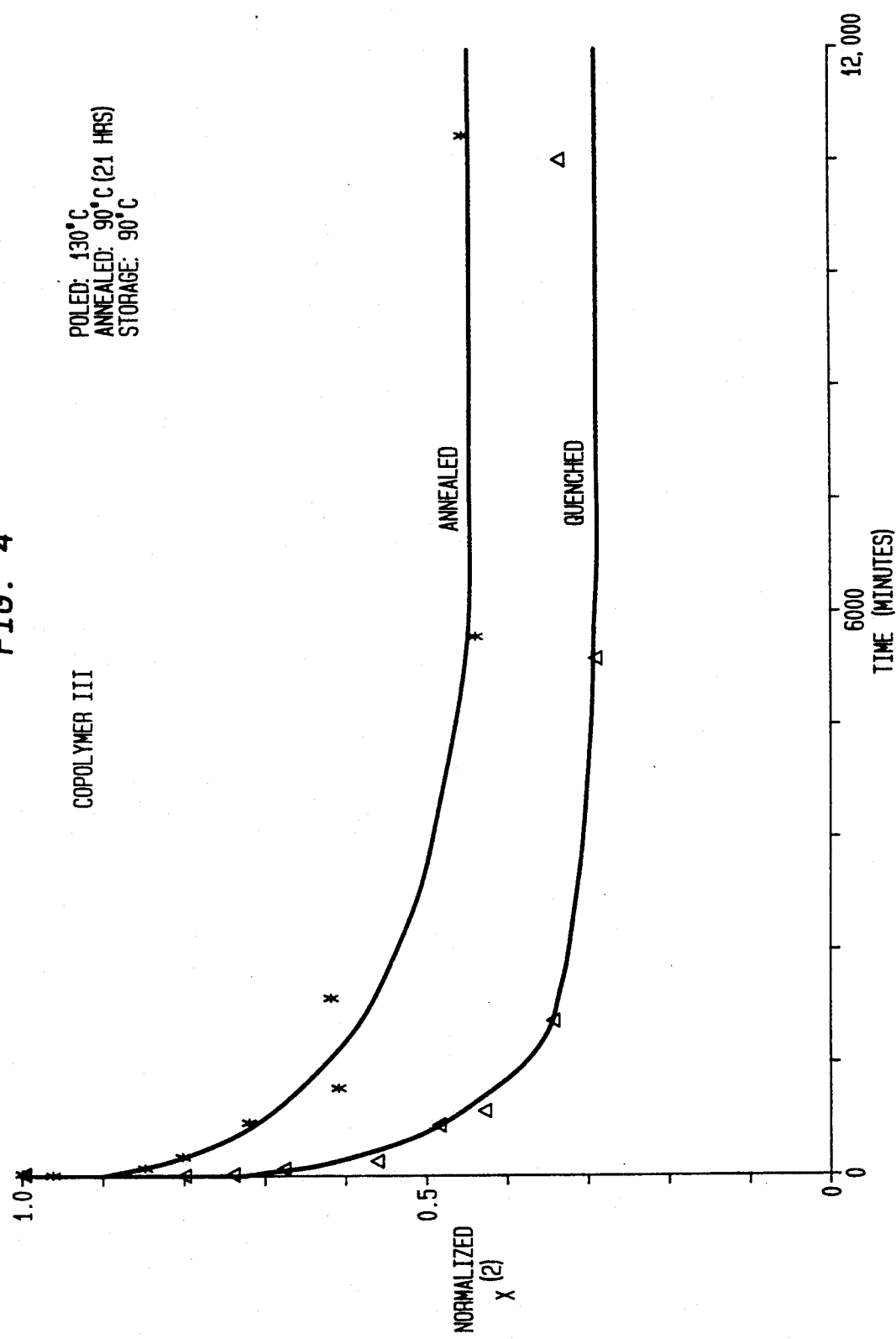

The B'/C' 50/50 copolymer III as represented in FIG. 4 has a glass transition temperature (Tg) of 122° C., and corresponds to the formula:

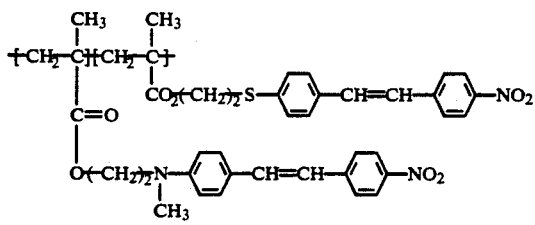

where C' is 4-[2-(4-nitrophenyl)ethenyl]phenylthio-2-ethyl 2-methyl-2-propionate.

Figure 5:
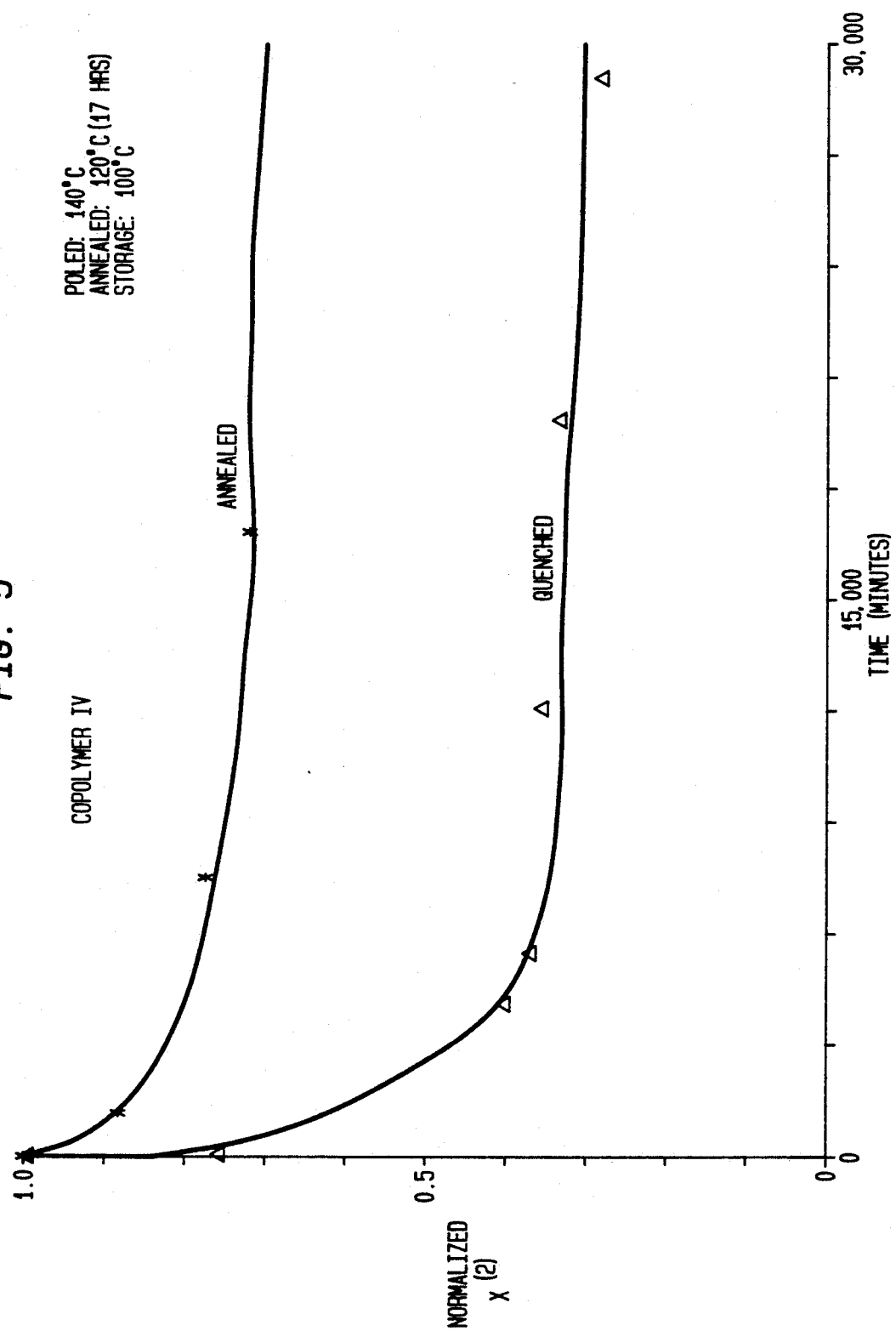

The B'/methyl methacrylate 50/50 copolymer IV as represented in FIG. 5 has a glass transition temperature (Tg) of 135° C., and corresponds to the formula:

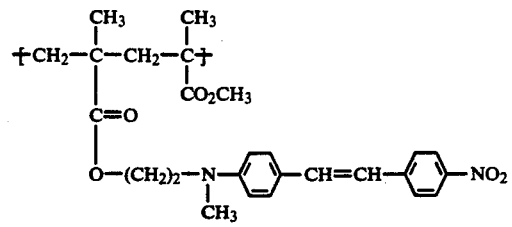

The figures demonstrate that a noncentrosymmetric side chain polymer medium has improved nonlinear optical stability if after poling and while maintaining the electric field effect the oriented polymer medium is annealed or slow cooled about an annealing temperature over a time period sufficient to achieve a thermal relaxation equilibrium in the oriented polymer medium.

As may be seen from the above examples and Figures hereto, samples heat-treated in accordance with the present invention exhibit substantially more second-order nonlinear optical activity after heat aging than samples that are simply quenched to room temperature. Specifically, each heat-treated sample exhibits at least twenty (20) percent more of its initial activity over the long term than samples that are quenched to from about Tg to temperature in about thirty (30) minutes.

Figure 6:
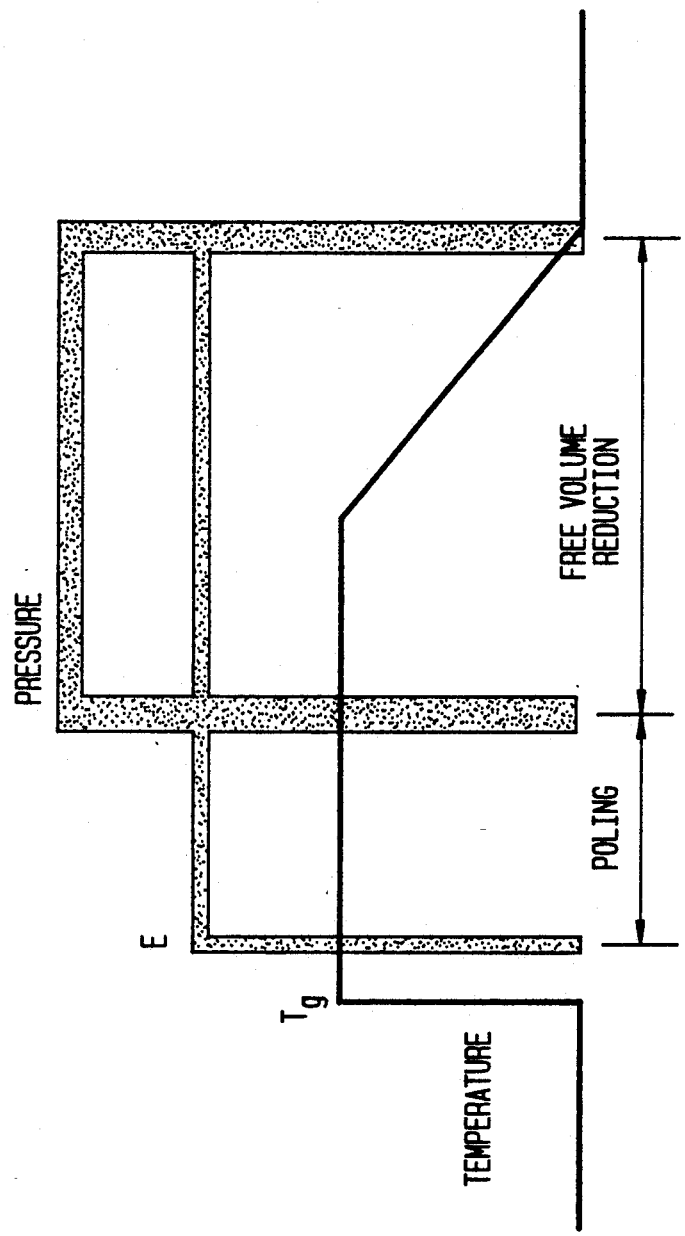
FIG. 6 is a schematic diagram showing the application of elevated pressure during processing.

Further variations and improvements on the present invention include the application of pressure as shown in FIG. 6. Typically, pressure is applied immediately after poling as shown in FIG. 6, but before removing the electric field. When the poling field and pressure is removed after the poled polymer is cooled down to room temperature, an increase in the stability of the induced structure over time is observed because of the inherent reduction in free volume of the polymeric structure.

While the invention has been described in detail hereinabove, various modifications will be apparent to those of skill in the art. Such modifications are within the spirit and scope of the present invention which is limited and defined only by the appended claims.

What is claimed:

1. A process for providing a second order nonlinear optical medium having a stabilized noncentrosymmetric orientation of polymer molecules, which process comprises:
   (a) heating a film of polymer incorporating active units capable of exhibiting second order nonlinear optical response to a temperature of about the glass transition temperature (Tg) of the film;
   (b) poling the polymer medium by applying an external electric field to induce noncentrosymmetry in the polymer medium by molecular orientation of said active units which exhibit second order nonlinear optical susceptibility;
   (c) cooling the noncentrosymmetric polymer medium to about room temperature; and
   (d) during said cooling step, heat-treating the polymer film at a temperature of at least above about 40° C. while maintaining said externally applied electric field to stabilize the second-order nonlinear optical activity of the film from decay over time such that the nonlinear optical medium so produced exhibits higher stabilized second order nonlinear optical activity than a corresponding medium produced by quenching the corresponding medium from about Tg to about room temperature in about 30 minutes under the influence of an electric field.

2. The process according to claim 1, wherein said step of heat-treating the medium includes the application of an elevated pressure.

3. The process according to claim 2, wherein said elevated pressure is from about 100 to about 10,000 atmospheres.

4. The process according to claim 1, wherein the step of heat-treating the polymer includes maintaining the polymer between about 80 per cent of its glass transition temperature (degrees C) and about 40° C. for a sufficient length of time to stabilize the polymer.

5. The process according to claim 4, wherein the step of heat-treating the polymer includes maintaining the polymer between about sixty percent of its glass transition temperature (degrees C) and about 40° C. for a sufficient length of time to stabilize the polymer.

6. A process for producing an optical medium having a stabilized noncentrosymmetric orientation of polymer molecules, which process comprises (1) heating a film of a polymer incorporating active units capable of exhibiting second order nonlinear optical response to a temperature of about the glass transition temperature (Tg) of the polymer; (2) poling the polymer medium by applying an external electric field to induce noncentrosymmetry in the polymer medium by molecular orientation of said active units which exhibit second order nonlinear optical susceptibility and (3) cooling the noncentrosymmetric polymer medium to about room temperature, wherein said step of cooling the polymer includes slow cooling of up to about 1° C. per minute following poling to a substantially constant annealing temperature below Tg and above room temperature which annealing temperature is maintained for a time period greater than 30 minutes, said external electric field being maintained during said steps of slow cooling and annealing whereby the nonlinear optical medium so produced exhibits higher stabilized second order nonlinear optical activity than a corresponding medium produced by quenching the corresponding medium from about Tg to about room temperature in about 30 minutes under the influence of an electric field.

7. In a process for providing an oriented nonlinear optical medium having a noncentrosymmetric orientation of polymer molecules which includes heating a film containing NLO active units to an elevated temperature of about the glass transition temperature of the film, poling the film by applying an external electric field to induce molecular orientation and cooling the medium to a temperature of below about Tg to freeze the oriented structure into place, a method of heat treating the polymer film during said step of cooling the polymer comprising maintaining said electric field while cooling said film wherein said cooling step includes maintaining said film below about Tg and above about 40° C. for at least about thirty minutes and wherein for at least one thirty minute period during cooling the film is maintained substantially below about Tg and the rate of cooling during said period is between about 0° C. per minute and about 0.5° C. per minute whereby the induced noncentrosymmetric structure is stabilized over time against decay.

8. The process according to claim 7, wherein for at least one thirty minute period during cooling the film is maintained substantially below about Tg and the rate of cooling during said period is between about 0° C. per minute and about 0.1° C. per minute.

9. The process according to claim 7, wherein for at least one sixty minute period the film is maintained substantially below about Tg and the rate of cooling during said period is between about 0° C. per minute and about 0.5° C. per minute.

10. The process according to claim 7, wherein for at least one six hundred minute period during cooling, the rate of cooling is between about 0° C. per minute and about 0.1° C. per minute.

11. The process according to claim 7, wherein for at least one six hundred minute period during cooling the film is maintained substantially below about Tg and the rate of cooling is between about 0° C. per minute and about 0.5° C. per minute.

* * * * *